(12) United States Patent
Franken

(10) Patent No.: US 10,286,718 B2
(45) Date of Patent: May 14, 2019

(54) DATA CARRIER COMPRISING A CUSTOMIZABLE AUTHENTICITY FEATURE

(71) Applicant: U-NICA Technology AG, Malans (CH)

(72) Inventor: Klaus Franken, Igis (CH)

(73) Assignee: U-NICA Technology AG, Malans (CH)

( * ) Notice: Subject to any disclaimer, the term of this patent is extended or adjusted under 35 U.S.C. 154(b) by 111 days.

(21) Appl. No.: 15/309,913

(22) PCT Filed: May 13, 2015

(86) PCT No.: PCT/EP2015/060703
§ 371 (c)(1),
(2) Date: Nov. 9, 2016

(87) PCT Pub. No.: WO2015/173364
PCT Pub. Date: Nov. 19, 2015

(65) Prior Publication Data
US 2017/0144469 A1 May 25, 2017

(30) Foreign Application Priority Data

May 16, 2014 (EP) ..................................... 14168698
Feb. 16, 2015 (EP) ..................................... 15155247

(51) Int. Cl.
*G06K 19/06* (2006.01)
*B42D 25/369* (2014.01)
(Continued)

(52) U.S. Cl.
CPC ........... *B42D 25/369* (2014.10); *B42D 25/41* (2014.10); *G06K 7/087* (2013.01); *G06K 19/06187* (2013.01)

(58) Field of Classification Search
CPC ....... G06K 19/06187; G06K 19/06196; G06K 2019/06225
(Continued)

(56) References Cited

U.S. PATENT DOCUMENTS 4,544,181 A 10/1985 Maurer et al.
5,552,236 A * 9/1996 Ohtake .................. B05D 1/185
156/326

(Continued)

FOREIGN PATENT DOCUMENTS

DE 29 07 004 B1 8/1980
DE 10 2008 011 817 A1 9/2009
(Continued)

OTHER PUBLICATIONS

Machine Readable Travel Documents, ICAO Doc. 9303 Pat III, 2015, pp. 1-49, vol. I, 7th Edition.
(Continued)

*Primary Examiner* — Daniel St Cyr
(74) *Attorney, Agent, or Firm* — Sughrue Mion, PLLC

(57) ABSTRACT

A data carrier, in particular a plastic card, has an authenticity feature (4) introduced thereon, which can be customized during radiation with a high-energy beam. The customizable authenticity features (4) consist of at least one magnetizable component, wherein the customizable authenticity features (4) are magnetically formed. The intensity and/or wavelength of the radiation is selected such that the customizable magnetic authenticity features (4) undergo a localized structural change during irradiation, wherein the magnetizable components of the customizable magnetic authenticity feature (4) are at least partially destroyed. Following the irradiation, the customized magnetic authenticity features (4) form an area of lesser or no magnetic field in the entire image.

21 Claims, 3 Drawing Sheets

(51) Int. Cl.
*B42D 25/41* (2014.01)
*G06K 7/08* (2006.01)

(58) Field of Classification Search
USPC ........................................ 235/493, 487, 449
See application file for complete search history.

(56) References Cited

U.S. PATENT DOCUMENTS

| | | |
|---|---|---|
| 6,262,306 B1 | 7/2001 | Leriche et al. |
| 7,198,302 B1 | 4/2007 | Fannasch et al. |
| 7,793,846 B2 | 9/2010 | Jones |
| 2004/0007625 A1* | 1/2004 | Kappe .................... B41M 3/14 235/487 |
| 2005/0098636 A1 | 5/2005 | Schumacher et al. |
| 2013/0200606 A1* | 8/2013 | Omar ...................... B41M 3/14 283/74 |
| 2013/0314486 A1 | 11/2013 | Goldau et al. |

FOREIGN PATENT DOCUMENTS

| | | |
|---|---|---|
| DE | 10 2011 116 490 A1 | 4/2013 |
| DE | 10 2011 116 491 A | 4/2013 |
| EP | 0 561 279 A1 | 9/1993 |
| EP | 1 008 459 A1 | 6/2000 |
| EP | 1 574 359 A2 | 9/2005 |
| EP | 1 322 478 B1 | 2/2010 |
| WO | 01/15910 A2 | 3/2001 |
| WO | 2009/074284 A2 | 6/2009 |
| WO | 2012/062505 A1 | 5/2012 |

OTHER PUBLICATIONS

International Search Report for PCT/EP2015/060703 dated Jul. 17, 2015.
International Preliminary Report on Patentability and Written Opinion dated Dec. 1, 2016 from the International Bureau in counterpart International Application No. PCT/EP2015/060703.

* cited by examiner

DATA CARRIER COMPRISING A CUSTOMIZABLE AUTHENTICITY FEATURE

CROSS REFERENCE TO RELATED APPLICATIONS

This application is a National Stage of International Application No. PCT/EP2015/060703 filed May 13, 2015, claiming priority based on European Patent Application No. 14168698.0 filed May 16, 2014 and 15155247.8 filed Feb. 16, 2015, the contents of all of which are incorporated herein by reference in their entirety.

TECHNICAL FIELD

The present invention concerns a data carrier, in particular a plastic card, with a magnetizing authenticity feature provided in said data carrier that is personalizable on irradiation with a high-energy beam, e.g. a laser beam or an electron or neutron beam, by means of changes in physical and/or chemical properties.

PRIOR ART

Today, data carriers in the form of identification cards, personalized pages or inlays for passports, as well as credit cards and similar plastic cards, must show a high degree of protection against forgery. There are numerous widely varying security features as well as special printing methods that can provide protection against forgery to a certain extent. A major challenge in this connection is to provide not only individualized security features, but in particular security features that are combined to a certain extent with the personalization or are a part thereof, i.e. are individualizable. The ready availability of laser systems and their broad range of application in the area of document security make them highly suitable for use in a secure personalization method. The laser technology currently available is exclusively used in practice for producing images such as portraits, graphic symbols, documents and the like.

It is known for example from DE 2907004 A that images in identification cards, but of course also other visually recognizable data such as signs, patterns etc., can be produced by means of a laser beam. In the present application, the functional layer from which, in the course of the method, the final image or any desired visible symbol or sign is produced, is composed of a thermosensitive layer. This functional layer extends over the card on a surface segment on which the image or other visually recognizable data are later to appear. The functional layer is ordinarily located in a composite with other plastic layers from which the finished card is produced as a film laminate in the course of card production. The image is burned in this case, with the intensity of the laser beam being accompanied by darkening of the irradiated site. Black and white images or grayscale images are routinely produced by this method today. It was recognized at an early stage that the advantages of this method, also referred to as laser engraving, lie in the high degree of protection against forgery and resistance to light and mechanical stress of cards produced in this manner, particularly those composed of polycarbonate.

This is confirmed, for example, by EP 1574359 A or EP 1008459 A. Security documents produced by means of laser engraving on polycarbonate laminates meet international standards for travel documents (ICAO Doc. 9303, Part III, Volume I) or even exceed these standards. For color graphics, systems comprising lasers with three different wavelengths are now used. A prerequisite is a functional layer in the data carrier composed of a formulation including color-producing components. The color-producing components of various colors must together provide a color spectrum composed of multiple primary colors, typically at least three. For practical reasons, the primary colors cyan [C], magenta [M], and yellow [Y] are preferred. However, other colors are also conceivable. The primary colors must also have an absorption spectrum that allows interaction with color laser light. In contrast to the aforementioned method of carbonization of initially invisible components, this method involves coloring by bleaching, i.e. brightening, of a color that is visible prior to irradiation. Because of the visible mixture of color components prior to irradiation, the substrate shows an extremely dark, ideally black shade. Such a method is described for example in WO 01/15910 A. The advantages of the further enhanced protection against forgery provided by a color representation of the document holder are offset in the method described herein and the products produced thereby by drawbacks that limit the practical value thereof. The authors describe how a laser beam of specified wavelength is used to bleach coloring agents, dyes, or pigments having a specified absorption spectrum in such a way that the complementary colors are retained. The method is therefore of great technical complexity and is essentially intended, as is laser engraving producing black and white images, to provide forgery-proof representation of photographic images.

Another laser method that allows forgery-proof color pictures to be produced by deactivation of light-sensitive dyes is proposed in WO 2012/062505 A. This method is characterized by the pigment-like action of a single energy-rich laser, which bleaches each individual pigment granule in the pigment layer with microscopic precision, after which the location thereof is photometrically determined by means of a prior method and a color chart is prepared based thereon.

Another approach (U.S. Pat. No. 7,793,846 B) involves laser systems that operate in the NIR range. In this case, the particles with the pigments are brought into close contact with IR radiation-absorbing substances, which in turn heat up by absorbing specific laser radiation and cause the adjacent pigments to undergo thermal color change.

DE 102011116491 A1 discloses a data carrier with a security element containing microcapsules. The microcapsule comprises a capsule shell with a transparent carrier medium and a plurality of magnetic opaque pigments. The opacity of the microcapsule can be reversibly intensified by applying a magnetic field because the magnetic field orients the magnetic pigments in such a way that on observation in the reflected light, the microcapsule appears in the color of the substrate base, and because in the absence of the magnetic field, the magnetic pigments are again statistically distributed within the microcapsule such that the observer perceives the microcapsules in the intrinsic color of the magnetic pigment. The capsule shell can be damaged by electromagnetic radiation, causing the carrier fluid to escape from the microcapsules and the pigments to remain immobile in the damaged capsule shells. The result is that the microcapsules are irreversibly fixed in an opaque state.

A method for producing an optically variable security element with a microcapsule-based color layer having a motif region is disclosed in DE 102011116490. This method provides a printing ink containing a plurality of microcapsules, with said microcapsules enclosing in their shells a carrier fluid and a pigment that can be reversibly magnetically oriented. An external magnetic field is applied in a partial area of the color layer containing the motif region in order to orient the rotatable pigments in the microcapsules in said region. The capsule shells in the motif region are damaged by electromagnetic radiation, causing the carrier fluid to escape from the microcapsules and the pigments to remain immobile in the damaged capsule shells, thus displaying the motif of the security element.

The purpose of all of the aforementioned methods is to produce a visible security feature. In the technical field of document security, however, multiple security levels are defined, and among these, as first stages (also referred to as first-level features), the features detectable visually and by the other senses constitute only one of three security levels. The second security level subsumes features that are detectable using simple technical means, i.e. with smaller, portable devices. In the simplest case, the means can be a UV lamp or a laser pointer. The three-stage features are of a more complex nature and are verifiable by forensic means. The various security levels serve to provide complete overall document security.

In order to meet this need, EP 1322478 B1 proposes the production of a feature that is recognizable in UV light and appears to the observer, based on the laser-induced bleaching process, as dark sections on a fluorescent surface element. According to this method, the laser light or another energy-rich radiation such as an electron beam deactivates a luminescent authenticity feature at selected sites. The visual impression corresponds to that of a negative image or a negative text. This feature allows the authentication of a security document by simple means such as a UV lamp, but this also limits its value, because the UV-active layer could be overprinted, which could alter the visual impression under UV light. Within the meaning of the present invention, a UV-active layer refers to a layer that exhibits fluorescence under irradiation with UV light. This definition is to be clearly distinguished from a layer that undergoes polymerization or curing under the effect of UV light, which occurs in the terminology of printing for the so-called UV inks. A forgery produced because a UV-active layer is overprinted instead of photochemically deactivated could be microscopically identified, but this would elevate the detection of the feature to the forensic level.

PRESENTATION OF THE INVENTION

An advantage of the method according to EP 1322478 is its economic viability with respect to handling, reliability, and cost. The inventors have determined that it is also possible to combine laser-based fluorescence quenching with other personalization methods based on laser technology. In practice, two-stage features are required is cases where rapid authentication of the document is needed. This typically applies to border posts or access control to the gate area of an airport. The combination of supplementary features has been shown to be advantageous at such checkpoints. In addition to methods that allow authentication under light of various wavelengths, methods based on magnetic features have proven to be effective as two-stage features. Magnetic strips have long been used for the storage of data sets, and their use extends beyond the security application to the storage of small amounts of data for commercial purposes, which is also used in customer cards, for example. In particular, methods are now established for security applications that can detect a magnetic digital image. A motif such as an image, writing, or a bar code can easily be applied with magnetic ink to the security document for identification purposes. For example, a magnetic security thread can also be identified by such a scanning method. Magnetic image capture devices are available e.g. from Regula-Rus CJSC, Moscow, or Matesy GmbH, Jena. Depending on the configuration of the detection devices, magnetic image display processes can be used as two-stage or three-stage methods.

Documents for establishing the identity of the holder are examined not only for the authenticity of the document per se, but also have features that are characteristic of the document holder. Accordingly, it must be possible to individualize the document in order to adapt it to its carrier. This is a requirement that is typically met by a portrait. A purely visual comparison of the likeness of the carrier in the document and his/her face is to be considered secure only to a limited extent. Although biometric methods promise more reliable identification, they are expensive to a degree that is not practical for most supervisory authorities. In contrast, two-stage features constitute a good compromise between tamper protection and the expense required for document inspection.

The use of fluorescent or magnetic features, or both feature types, in the same document is known in the production and personalization of identity documents. According to prior art, however, production and personalization of magnetic and fluorescent features in one document must be carried out in technically separated processes. For example, fluorescent colors can be applied by pressure and verified by UV light. Deactivation of the fluorescent surface elements of the document can then be carried out means of an opaque imprint or an opaque film.

Another possibility for deactivating fluorescence is the photochemical destruction of the fluorescence-active compound or its conversion into a non-fluorescence-active compound proposed in EP 1322478 B1. For the personalization of finished but not yet personalized documents, for example in a consulate or competent local authority, bleaching of a fluorescence-active substrate, e.g. the personalized page of a passport, using a desktop device is a highly practical solution characterized by reliability, clean and user-friendly handling, and low cost (no consumable material).

The carriers for magnetization used in magnetic security features according to prior art, in contrast to inorganic fluorescent dyes iron, cobalt, nickel, and rare earth doped ferrous metals, are doped magnesium oxide, magnetic perovskite, iron(II,III) oxide (magnetite), etc., and their magnetic effect cannot be photochemically erased by the action of electromagnetic radiation. These metal magnets are referred to in the relevant literature as atomic magnets. For example, it is common to use magnetic inks based on magnetite having a particle size of between 2 nm and 20 nm in order to impart macroscopically measurable magnetism to a non-magnetic substrate such as a paper or polymer. Although these organic magnets can be demagnetized by applying a coercive field, this does not mean that the ferromagnetism of the substrate irreversibly disappears. Remagnetization by applying a corresponding field is possible at any time.

The basis of magnetism as a macroscopic phenomenon is the interaction of multiple electrons with unpaired spin, with a minimal number of electrons having the same spin direction being required (cooperative effect). Measurable remanence, and thus ferromagnetism or ferrimagnetism, cannot occur with isolated radicals or e.g. unpaired electrons if the spin-spin interaction between the unpaired electrons in only minimal or completely absent. The conversion of paramagnetism to ferro- or ferrimagnetism requires spin-spin coupling that involves a sufficiently high number of electrons.

The requirements of quantum mechanics impose conditions such as minimal proximity between unpaired electrons having the same spin direction. Remote effects of 0.3 nm to 0.5 nm are typical values for metallic ferromagnets, while the remote effect of molecular units can be exerted at up to a nanometer or more as a result of "superexchange" mechanisms. Molecular magnets are therefore subject to specified conditions, for example with respect to their spatial structure, the nature of their bonds, and the nature of the unpaired electron or electrons in a molecule. As thermal influences have a direct effect on the remote action of the spin of the unpaired electrons, there are limit temperatures above which there is not sufficient coupling and thus no macroscopic magnetism. The corresponding temperature values, referred to as Curie temperatures, are specific material constants for each magnetic material. For practical applications, in particular applications in the area of ID documents, only Curie temperatures above room temperature are feasible. For classical magnetic materials, Curie temperatures ($T_c$) of a feasible magnitude, such as Fe 768° C., Co 1121° C., Ni 360° C., SmCo 750° C., $Fe_2O_3$ 450° C., or NdFeB 300° C., are applicable. Magneto-optical storage methods use Curie temperatures, under the effect of a laser at a specified site of the storage medium, to heat the magnetic base material above its Curie temperature and thus delete the data from the medium. Remagnetization is suitable for depositing new data sets on the same storage medium. Classical magneto-optical storage methods are therefore reversible methods.

Taking EP 1322478 B1 as a point of departure, an object of the present invention is therefore to provide personalization with higher reliability, as well as the possibility of later verification of said personalization that can be carried out both economically and rapidly.

In other words, the purpose of the present invention is to personalize a security document after it is produced, wherein for this purpose, an economic and rapid method is provided on the one hand, and on the other, a plurality of individualization features that are mechanistically completely different for security reasons complement one another such that a high degree of security is provided by the redundancy of the features. A further aspect of the invention is that verification of personalized data can be carried out by means of the devices commonly in use by government supervisory authorities.

The object of the invention is achieved by the device having the features of claim 1. Further embodiments are given in the dependent claims.

Data carriers of any kind are mentioned, in particular plastic cards with the authenticity features introduced into the composite card that are personalizable on irradiation with a high-energy beam, e.g. a laser beam or an electron or neutron beam. The personalizable authenticity features are composed of at least one color-active component and at least one magnetizable component, wherein the personalizable authenticity features are configured to be luminescent and magnet. In this application, it is to be understood that the term color-active refers to a characteristic of the color-active component based on which, after activation of the color-active component by means of electromagnetic radiation, radiation in the visible and/or ultraviolet and/or infrared region of the electromagnetic spectrum is emitted. It is further to be understood that the term magnetizable refers to a characteristic possessed by the magnetizable component in its original state. The magnetizable component can be magnetized over its entire surface or in partial areas in a magnetizing process so that the magnetized partial areas are magnetic after the magnetizing process, and said partial areas are referred to here as magnetic components. This magnetization of the magnetizable component can be carried out by means of a magnetizing device. This magnetism can be photochemically erased entirely or partially, producing an authenticity feature that is neither magnetic nor magnetizable in the irradiated partial areas. The intensity and/or wavelength of the beam is selected such that personalizable luminescent and magnetic authenticity features undergo a local structural change on irradiation, wherein the color-active component and the magnetizable component of the personalizable luminescent and magnetic authenticity feature are at least partially destroyed by the local structural change. In this case, the personalized luminescent authenticity features do not luminesce together with the non-personalized luminescent authenticity features on irradiation, causing a negative image to become visible in an overall luminescent image or a negative luminescent image, and the personalized magnetic authenticity features form a magnetic field-free area in the overall image after irradiation.

By means of the action of suitable radiation on a substrate with fluorescent and magnetic surface elements, preferably from one radiation source and in one working step, both the luminescence and the magnetization are thus eliminated at the exposure site, preferably irreversibly.

The non-personalized areas therefore luminesce on corresponding excitation and/or show magnetism.

According to the embodiments described in further detail below, all possible incorporation methods and installation sites of the authenticity features according to the invention in the data carrier used for identification are claimed. The luminescent and magnetizable or magnetic authenticity features can therefore be printed in the form of printing ink on a specified layer or a plurality of layers of the data carrier or applied in another manner. However, the authenticity features can also be incorporated into the synthetic polymer of one or a plurality of layers of the data carrier. The luminescent, magnetizable, or magnetic authenticity features can thus be incorporated into the adhesive, the lacquer, or the plastic material as an additive. The luminescent and magnetizable or magnetic authenticity features need not be installed at the same sites of the data carrier, nor do they have to be incorporated in the same manner. For example, it is conceivable for the color-active component to be part of an adhesive and the magnetic or magnetizable component to be introduced into a film.

The color-active component is located in and/or on at least one luminescent layer, and the magnetic or magnetizable component is located in and/or on the at least one magnetizable layer.

The magnetizable layer can therefore contain the magnetizable component that has not yet been magnetized by a magnetizing device. However, the magnetizable layer can also contain the magnetic component if magnetization of the magnetizable component has already been carried out or when a component is used that is already magnetic in its original state.

The composite card can have a covering layer and a carrier layer, wherein the covering layer can be arranged on the side of the data carrier that faces toward the irradiation and is translucent to the beam used.

The magnetizable layer and the luminescent layer can be arranged one on top of the other, wherein the layer that is arranged on top and is irradiated by the beam as the first layer is preferably translucent to the beam used.

The luminescent component and the magnetic or magnetizable component can be located together within and/or on at least one magnetoluminescent layer.

The magnetoluminescent layer can therefore contain the magnetizable component that has not yet been magnetized by a magnetizing device. However, the magnetoluminescent layer can also contain the magnetic component if the magnetization of the magnetizable component has already taken place.

Such a layer, referred to here as a magnetoluminescent layer, can be a correspondingly formulated ink that is printed or applied by spraying, is part of a lamination film, or is part of a thin film.

The luminescent component and the magnetic or magnetizable component can be constituents of a compound. This compound can be located in and/or on at least one molecular magnetoluminescent layer.

Moreover, an embodiment is also claimed in which both functions, i.e. that of the color-active, luminescent component and that of the magnetic or magnetizable component, can be combined in one molecule. A layer in which or on which such molecules are located is refereed to here as a molecular magnetoluminescent layer.

The molecular magnetoluminescent layer can therefore contain a compound in which the magnetizable component has not yet been magnetized by a magnetizing device. However, the molecular magnetoluminescent layer can also contain a compound in which magnetization of the magnetizable component has already been carried out.

The data carrier can have one or a plurality of additional layers, wherein said layers can be configured as protective layers and/or contain further additive substances that change color on irradiation.

The layer described in this embodiment, referred to here as a protective layer, can be located on a substrate or a data carrier composed for example of a paper or polymer, e.g. polycarbonate. For example, such a protective layer can enclose the further layers of the data carrier that contain the luminescent, magnetic, or magnetizable components. These protective layers can serve as primers or as protection for the substrate, e.g. in the form of layers opaque to the action of light on a sensitive substrate such as paper, can have graphic functions such as carbonization on laser exposure, i.e. turn black at the impingement site of the laser, or can contain color pigments or dyes that in turn are bleached with laser light.

The magnetizable layer and/or the luminescent layer and/or the magnetoluminescent layer and/or the molecular magnetoluminescent layer and/or the additional layer can extend over the entire surface of the data carrier.

The magnetizable layer and the luminescent layer can be arranged adjacent to each other.

The at least partial destruction of the color-active component and the magnetic component of the personalizable authenticity feature can be carried out by irradiation of the same type.

A preferred embodiment can therefore combine the activity of a radiation source such as a laser of suitable frequency with the reaction in various layers, e.g. in a magnetizable layer and a luminescent layer that both change their structure on irradiation such that both their luminescence and magnetizability are eliminated.

The at least partial destruction of the color-active component and the magnetizable component of the personalizable authenticity feature can thus be carried out with at least two types of irradiation.

For example, personalization can be carried out by the action of two types of electromagnetic radiation, wherein a first radiation type—characterized by parameters such as frequency, intensity, polarization, etc. is effective for elimination of the magnetization and a second radiation type is effective for elimination of the luminescence.

The personalized authenticity feature can be caused to luminesce and be demagnetized under the effect of electromagnetic radiation and/or corpuscular radiation and/or is effectible by photoluminescence and/or chemoluminescence and/or bioluminescence.

In all of the embodiments disclosed herein, laser radiation in the NIR frequency range or corpuscular radiation such as electron irradiation (the e-beam method) can therefore be used in order to deactivate the luminescent and/or the magnetic component.

Deactivation of so-called up converters (anti-Stokes mechanism) is also claimed according to the present invention, provided that said converters can be destroyed by electromagnetic irradiation or their energy-converting function can be eliminated in other ways, for example in that a cooperative effect between a rare earth up converter and an auxiliary material—also described in the literature as a photonic concentrator, a solar concentrator, or a fluorescent concentrator—is destroyed by the effect of e.g. laser radiation on the auxiliary material. Up converters are recognizable in the visible region by means of excitation in the NIR frequency range. Organic molecules that are suitable as auxiliary materials in the sense of a fluorescent concentrator are known for example as fluorescent dyes in OLEDs or as ready-made dyes based on perylene derivatives.

The luminescence can occur in the visible and/or non-visible spectral range, for example the near infrared range, e.g. by means of indocyanine green.

The luminescent substance of the personalizable authenticity feature can belong to the substance class of tin sulfide derivatives, benzoxazinone derivatives, pyrene derivatives or pyrazoline derivatives, porphyrins, stilbenes, optical brighteners (such as Blancophor), quinines, or complexes with triazole ligands. The luminescent substances can therefore also be derived from nature, including organometallic complexes, e.g. compounds that are also important for OLEDs, and to a limited extent may also be inorganic compounds. The magnetizable substance of the personalizable authenticity feature can belong to the substance class of organometallic complexes, for example with CN or TCNE ligands, metallocenes or valence tautomers, or may be an organic compound with a radical-bearing functional group stabilized by resonance and/or steric effects. Resonance stabilization of radicals takes place for example in polynuclear aromatic compounds, as known for example from the triphenyl methyl radical, and is also possible in condensed aromatic and/or conjugated n-systems such as perylene derivatives. Steric radical stabilization is known for example in the substance TEMPO (2,2,6,6-tetramethyl piperidinoxyl). Substances whose radical is stabilized by both steric and resonance effects are particularly suitable. The radical-bearing functional groups can be carbonyl radical anions or nitroxide radicals, or can also be the anion radicals of TCNQ (tetracyanoquinone dimethane), TCNE (tetracyanoethylene), or metallocene ligands such as bis-pentamethyl cyclopentadienyl ($MCp_2$), and in general, n-systems in the ligands of high-spin complexes. The compound of the personalizable authenticity feature can belong to the aforementioned molecule classes or be composed of combinations of these molecule classes.

The magnetizable substance preferably has a Curie temperature above room temperature.

Suitable compound classes for UV colors within the meaning of the invention, i.e. dyes or pigments that are excitable by UV light, with emission in the visible light region, also comprise substances of the class tin sulfide, benzoxazinone, and pyrene and pyrazoline derivatives, but are not limited thereto. It is advisable, but not absolute necessary, for fluorescence-active compounds to be contained in formulations that protect them from the usual environmental conditions, in particular the effects of oxygen, in order to increase the quantum yield of excimers or prevent quenching, for example by oxygen. Luminescent colors that are excited to luminescence not by UV radiation but by other mechanisms, such as chemo-, bio-, or triboluminescence, are also included within the claimed scope of the invention, although excitation by UV light is the preferred configuration in the practice of document verification.

Preferably, as magnetizable substances, ferromagnetic or ferrimagnetic organic substances (known as molecular magnets) are used having absorption bands that interact with the laser light, and after irradiation, undergo a structural change that sharply reduces or even eliminates their macroscopically observable magnetism.

The known purely organic ferromagnets show Curie temperatures approaching absolute zero and are therefore unsuitable for practical application.

Examples thereof are the p-nitrophenyl nitronyl nitroxide radical $T_c$=0.6 K, organically doped fullerene systems, e.g. TDAE with Tc=16.1 K, or the β-phase of the dithiadiazolyl radical in $p-NC.C_6F_4.CNSSN$ with $T_c$=35.5 K, with these molecules showing macroscopically observable magnetism only in a supramolecular spatial configuration of the molecular arrangement. The purely organic molecular magnets are currently the object of a highly dynamic area of research that promises the medium-term realization of organic molecular magnets with Curie temperatures of room temperature or higher. According to the current state of the art, organometallic substances, particularly the cyano complexes, promise improved suitability within the scope of the present invention. The research in the area of organic magnets was initiated with the complex $V[(Cr(CN)_6]_{0.86}*0.2.8H_2O$ with a Curie temperature of 315 K. The magnitude of typical coercive field strengths is 1000 Oe or 80 KA/m, which fits in well with the working range of commercial devices used by supervisory authorities for the visual representation of magnetic fields. The state of the art although this is unconfirmed suggests organometallic compounds having far higher coercive field strengths in the SmCo range of 17 800 Oe, which thus go far beyond the requirements of the present invention with respect to magnetizability. The ferromagnetic complex $V(TCNE)_2* 0.5CH_2Cl_2$ shows a molecular saturation magnetization and Curie temperature comparable to chromium dioxide as well as a coercive force of 60 Oe, which is suitable for practical application. At the same time, the tetracyanoethylene dimer anion radical, with a strong absorption band of 533 to 535 nm, indicates that excitation with visible light, in particular laser light, of the corresponding wavelength destabilizes the n-dimer and thus the radical. Although the sensitivity of the complex to air and thermal stress above 350 K limits its use according to the invention, this also shows that stable derivatives or related complex bonding in a stabilizing formulation are suitable candidates for molecular magnets within the scope of application of the invention.

Production of the purely organic magnet is always accompanied by the problem of contamination by metallic components that also have magnetic properties, so that many results with respect to the representation of ferromagnetic organic and organometallic compounds that were not obtained under highly controlled conditions with respect to purity must be called into question. For example, U.S. Pat. No. 6,262,306B (Christian Leriche et al.) proposes an entire series of imines having ferromagnetic properties without the constraint of a supramolecular order, e.g. as a polymer. EP 0561279 B (Ohtake, Tadashi et al.) claims an organic magnetic film in which both ferrous metals and metals existing only paramagnetically in the elemental state are mentioned as carriers of the unpaired electrons. In addition, organic materials are also mentioned in the present application. Although EP 0561279 B claims incorporation into a film that stabilizes the supramolecular order, it is suspected that metallic impurities may have produced the magnetism, especially as films containing classical metal magnets are also claimed. According to the present invention, the substances described in the above two patents, with respect to their feasibility, are not utilizable because no chromophore is present that by interaction with laser light could change its structure, reducing the spin-spin interaction to such an extent that the remanence observable prior to irradiation would disappear. In contrast to the aforementioned concepts of Leriche and Ohtake, in DE 102008011817 A, Heinz Langhals proposes perylene-3,4:9,10-tetracarboxylic acid bisimides as carriers for an organic high-temperature ferromagnet. As extensive n-systems, they show highly favorable stabilization of the radical anion of an imide functional group on the one hand, and on the other, show a tendency toward self-assembly that arranges these molecules advantageously for a spin superexchange interaction. Chemical and photochemical strength can also be influenced by suitable radicals on the terminal nitrogen atoms. After all, perylenes, like other condensed aromatic compounds, show absorption spectra with bands in the visible and NIR region, which suggests an interaction with and thus possible effects on the radical electron by laser radiation. By means of suitable functionalization of the basic chemical structure, such a molecular magnet can be adapted to the requirements of a magnetically readable security document that can be irreversibly erased with laser radiation. On the one hand, a photochemical mechanism must be allowed that destabilizes the radical after excitation with laser light, which can take place for example by rearrangement of the stabilizing conjugated bonding system, a change in other stabilizing groups, or excitation of the radical electron itself with a subsequent combination reaction. It is also feasible to bring the molecular magnet into contact with a latent reactand that undergoes a reaction with the unpaired electron after exposure to laser light. On the other hand, the molecular magnet, i.e. the radical anion in the case of perylene carboxylic acid, must remain stable throughout the useful life of the security document. However, these two apparently contradictory requirements can be fulfilled by a suitable design of the ferro- or ferrimagnetic molecule. The chemical strength of compounds having ferro- or ferrimagnetism that can be erased by electromagnetic radiation with respect to the usual environmental conditions must generally be seen as too high for permanent use in an everyday product because of the reactivity of the group bearing the radical, but protection of compounds that are unstable with respect to air or humidity by encapsulation is well known.

For the production of security documents, it appears ideal to apply the molecular magnets as a color pigment—optionally as an encapsulated color pigment—in an ink or lacquer by means of a printing or coating process. Chemical strength can also be achieved by providing the magnetic organic material with a protective layer in order to protect it from environmental influences. Here, the protective layer or the capsule material must be at least partially translucent to the laser radiation of suitable frequency.

The magnetizable layer also preferably contains functional substrates (molecular magnets) from the compound classes comprising all purely organic molecules, e.g. carbonyl group-functionalized condensed aromatic compounds or heterocycles and organometallic molecules, e.g. with TCNE ligands or ligands with multinuclear aromatic compounds, which in turn establish extensive radical stabilizing n-systems with unpaired electrons having the same spin direction and a superposition allowing a sufficient spin-spin interaction and sufficient spin density for macroscopically observable magnetism. This superposition can take place by means of self-assembly, a polymer composite of magnetizable monomers, or ordered fixation in a matrix such as a film.

As mentioned above, the compound of the personalizable authenticity feature, with the luminescent component and the magnetizable component being constituents of said compound, preferably belongs to the molecule classes of the polycyclic compounds, aromatic compounds, or conjugated compounds, which show absorption on irradiation with high-energy light such as UV light, luminesce in the visible region, and also have structural features that can constitute a molecular magnet, e.g. a radical or radical anion stabilizing π-system with protective groups that suppress a combination reaction. Pyrenes with a luminescent function and perylenes with a ferromagnetic function are known. The similarity of the two molecule classes indicates that a combination of these functions in one molecule is conceivable according to the invention.

In summary, it can be said that the magnetizable components used here can be understood as so-called molecular magnets. Various substances can be referred to depending on their composition as organic or organometallic magnets, and collectively as molecular magnets. As mentioned above, the basis of magnetism as a macroscopic phenomenon in these molecules is chiefly the interaction among their unpaired electron spins. In particular, it is not only required to have molecules whose atoms possess a magnetic moment, but these atoms must also be arranged in the molecule such that the magnetic moments mutually interact. Here, the distances over which the interaction extends are of decisive importance for the nature of the macroscopically measurable magnetism. Long interaction distances resulting from an intramolecular order or a large-scale macromolecular order provide the prerequisite for measurable ferro- or ferrimagnetism. This macroscopically measurable magnetism is an important prerequisite for the present invention. Even if the spin-spin interaction is limited purely to intramolecular extension, which is the case for example in certain complexes whose spin-bearing centers are mutually bonded by diamagnetic bridges, a measurable effect can be observed. This effect is manifested in the form of high saturation magnetization without the occurrence of permanent magnetization after removal of the external magnetic field. After the coercive field is removed, such complexes exhibit diamagnetic behavior. They then constitute individual molecule magnets whose special magnetic behavior is referred to as superparamagnetism. It is conceivable that compounds showing superparamagnetic behavior are also unstable within the meaning of the invention.

The invention is essentially based on the ferromagnetism or ferrimagnetism of organic or organometallic structures whose magnetism can be reduced or eliminated by laser light. Ferromagnetism is understood to refer to the characteristic of certain materials of containing elementary magnets, i.e. a magnetizable material with a magnetic dipole that possesses a variable direction (i.e., the above-mentioned unpaired electron spins of the spin-bearing atomic centers, for example), which can be oriented parallel to one another. In an external magnetic field, these materials show intrinsic magnetization that is independent of said external magnetic field. Therefore, this magnetization is not induced, but the external magnetic field determines the direction of the elementary magnets, i.e., the direction of the parallel-oriented elementary magnets in the ferromagnetic material is turned so that they are parallel to the external magnetic field, which means tat the ferromagnetic material, in this case the magnetizable component, is magnetized. Conversely, the ferromagnetism related thereto shows a certain number of elementary magnets with antiparallel orientation, but not as many as the elementary magnets with parallel orientation. In total, therefore, sufficient coupling of the spin occurs to produce macroscopically measurable magnetism. Examples of atomic magnets showing ferromagnetism are certain metal oxides with a spinel structure.

In the case of organometallic complexes, both ferro- and ferrimagnetic couplings are known. Complexes have been reported that can show both magnetic properties. The magnetizable component of an authenticity feature preferably shows intrinsic magnetization in an external magnetic field that is independent of said external magnetic field, and is magnetized by the external magnetic field. The inherent magnetization of the magnetizable component is oriented parallel to the external magnetic field, and as a result, the magnetized component is then magnetic, and the personalizable magnetic authenticity feature then becomes a personalized magnetic authenticity feature.

Depending on the temperature, electric field, pressure, mechanical action, chemical change, or action of light, molecular magnets can be converted from the ferromagnetic to the antiferromagnetic or the ferromagnetic to the paramagnetic state. For example, the molecular magnets used here can show absorption bands that interact with the laser light, and after irradiation, undergo a structural change that sharply reduces or even eliminates their macroscopically observable magnetism. This demagnetization is a process by which the ferromagnetic material that has become permanently magnetic completely or partially loses its magnetic polarization, i.e., the magnetizable component is completely or at least partially destroyed.

This photochemical erasing of the magnetism produces an authenticity feature that is neither magnetic nor magnetizable in the irradiated areas. Therefore, the magnetic authenticity feature personalized in this manner shows a magnetic field-free region at the irradiation site. While the non-irradiated sites continue to show magnetic areas that can be detected and visualized by a suitable detection device, for example with respect to the direction and strength of the magnetic field, the magnetic field-free area is not detected and visualized by the detection device.

After irradiation with a high-energy beam, the personalized magnetic authenticity feature is preferably neither magnetic nor magnetizable at the irradiation site and forms an area of lesser or no magnetic field at said site.

This area of lesser or no magnetic field of the personalized magnetic authenticity feature is not detected and/or visualized on observation by a suitable detection device, while areas of the personalized magnetic authenticity feature that were not exposed to irradiation with a high-energy beam have magnetic areas that are detected and/or visualized by the suitable detection device.

As also mentioned above, instead of a first color-active component, a compound can be used for the personalizable authenticity feature, for example in the form of a luminescent substance and a further magnetizable component, for example in the form of a molecular magnet, i.e. a single component that is both color-active and magnetizable. This means that a molecular compound can be used that is both luminescent and magnetizable or magnetized, and wherein both the luminescent component and the magnetizable or magnetized component of the molecular compound are at least partially destroyed by irradiation. The at least partial destruction of the luminescent component of the molecular compound causes this area of the authenticity feature not to luminesce on irradiation by a suitable detection device, while the non-irradiated areas luminesce on irradiation by the detection device. The at least partial destruction of the magnetizable or magnetized component of the molecular compound causes this area of the authenticity feature not to be detected and visualized on observation by a suitable detection device, while the undestroyed areas of the authenticity feature show magnetic areas that are detected and visualized by the detection device, for example with respect to the direction and strength of the magnetic field.

A compound is therefore preferably used that is a molecular compound in which the magnetizable component and the color-active component are constituents of said molecular compound. This molecular compound is both luminescent and magnetizable, wherein the magnetizable component of the molecular compound is magnetized by the external magnetic field and is then magnetized, and wherein irradiation causes both the luminescent component and the magnetic component of the molecular compound to be least partially destroyed at the irradiation site.

Because of the at least partial destruction of the luminescent component of the molecular compound, this area of the authenticity feature does not luminesce on irradiation by the suitable detection device, while the non-irradiated areas luminesce on irradiation by the detection device. Moreover, because of the at least partial destruction of the magnetic component of the molecular compound, this area of the authenticity feature is not detected and/or visualized on observation by the suitable detection device, while the non-irradiated areas are still magnetic areas that are detected and/or visualized by the detection device.

The photochemically deactivated and demagnetized areas of the luminescent and magnetic authenticity features can be visualized by suitable detection devices as images, letters, or any other type of sign, stripe, or dot pattern. The data introduced in this manner into the finished but not yet personalized document can be used for personalization, but also contain metadata that can be selectively introduced in the course of personalization, for example at the office issuing the relevant security document.

BRIEF DESCRIPTION OF THE FIGURES

Preferred embodiments of the invention are described in the following with reference to the drawings, which are to be understood as solely explanatory and not limitative. The drawings show the following.

DESCRIPTION OF THE PREFERRED EMBODIMENTS

Figure 1:
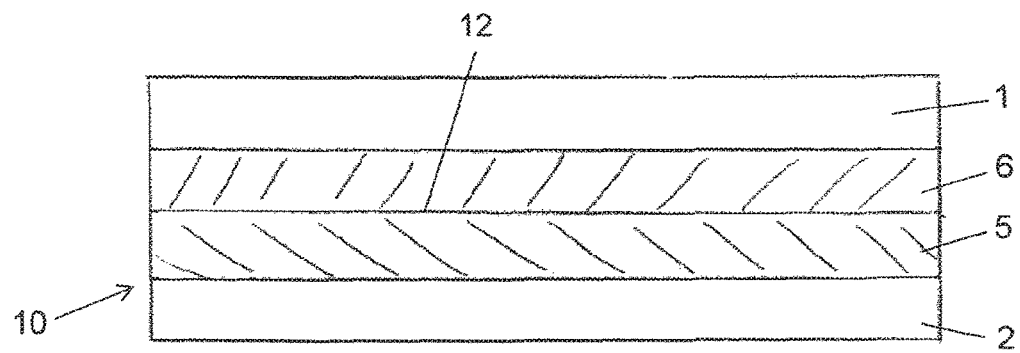
FIG. 1: a section through a data carrier with a card structure according to a first embodiment.

FIG. 1 shows sectional view of a data carrier 10 in dimensions that are not to scale. The data carrier 10 can in particular be a composite plastic card having the card structure shown in FIG. 1 in a first embodiment. A luminescent layer 5 and a magnetizable layer 6 are arranged between a covering layer 1 and a carrier layer 2. The luminescent layer 5 and the magnetizable layer 6 extend over the entire carrier layer 2 and come into mutual contact on a flat surface 12. The covering layer 1 and/or the carrier layer 2 are transparent or partially transparent to predetermined wavelengths of a light source, as described below. Suitable materials for the covering layer 1 and/or the carrier layer 2 are lacquers such as cationically or radically curing UV lacquers or physically curing lacquers, lamination films, e.g. of PET, PVC, or preferably PC, applied if necessary with adhesives, e.g. of the types Degalan (Evonik-Degussa) or Beva (from CTS), wherein an adhesive can also be dispensed with, as is possible with PC, or transfer films ("thin film") based on the aforementioned lacquers, e.g. with carriers of PET or siliconized paper.

The luminescent layer 5 comprises a luminescent material, as mentioned in the present description, and a translucent plastic carrier, of PC for example, printed or coated with fluorescent printing inks or lacquers, e.g. with pigments of the CRANE color series from Krahn Chemie. Another variant is application of the luminescent material by means of a casting process. Examples of suitable luminescent materials include, in particular, tin sulfide derivatives, benzoxazinone derivatives, pyrene derivatives or pyrazoline derivatives, porphyrins, stilbenes, optical brighteners (such as Blancophor), quinines, or complexes with triazole ligands.

The magnetizable layer 6 comprises a magnetic or magnetizable material, as mentioned in the present description. For example, pure organic molecules such as carbonyl-group-functionalized condensed aromatic compounds or heterocycles and organometallic molecules, for example with TCNE ligands or ligands with multinuclear aromatic compounds, can be used. In particular, an encapsulated radicalized perylene derivative can be used that is applied to the interior side of the covering film as a physically drying lacquer or to a carrier composed e.g. of PC, with it being important to ensure mild conditions during application of the covering layer 1. Another variant is characterized in that a film containing an encapsulated perylene derivative is cast onto the carrier layer and then, following partial curing, i.e. as a still tacky film, provided with a covering layer which, following further curing, bonds strongly to the covering layer 1 or another layer lying thereon, for example layer 5.

Layers 5 and 6 are produced either by even application of the corresponding material to one layer or by incorporation of the corresponding materials into a polymer matrix of these layers.

The magnetizable layer 6 is applied adjacent to and on the luminescent layer 5, with the covering layer 1 being defined as the "upper" layer. It is also possible to provide the magnetizable layer 6 beneath the luminescent layer 5. Moreover, it is possible, although this is not shown here, to arrange an intermediate separating layer that is advantageously transparent to visible wavelengths (or for wavelengths of the sensors observing the excitation) between the two layers 5 and 6.

The arrangement over the entire surface of the carrier layer 2 does not necessarily mean that the data carrier as a whole is provided with the layers 5 and 6 over its entire surface. It is also possible for the luminescent layer 5 and the magnetizable layer 6 to be provided in a window (not shown in the drawings) and for the area around the window to be opaque or non-transparent to said influencing light radiation. The window can thus be a partial window, so to speak, in which a portion of the covering layer 1 or a portion of its carrier layer forms windows that are impermeable to the laser radiation, while the remainder of the layer is opaque to this wavelength.

Figure 2:
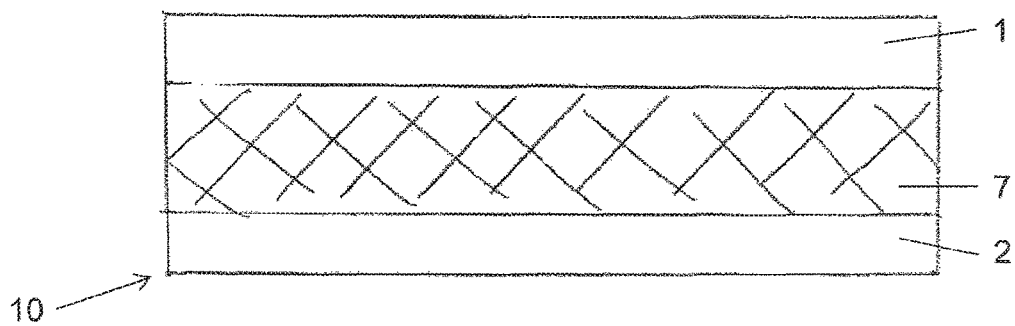
FIG. 2: a section through a data carrier with a card structure according to a second embodiment.

A further embodiment of a data carrier 10 is shown in FIG. 2, wherein the luminescent component and the magnetizable or magnetic component are located together in a magnetoluminescent layer 7. On exposure to radiation effective for this layer from the aforementioned light source, personalization is carried out precisely at the site of irradiation, wherein the interaction with the light radiation involves either the luminescent component of the layer 7 or the magnetic component of the layer 7, or both the luminescent and magnetic components of the layer 7. It should be noted here that in the case of magnetizable components, said components must first undergo magnetization so as to produce the magnetic components. The luminescent component and/or the magnetic component of the layer 7 is "marked" by means of the light source in that, with respect to the luminescent component, the "UV color" (as described in EP 1322478) is completely bleached locally at the site of the feature and in that, with respect to the magnetic component, the magnetic molecules are completely demagnetized locally at the site of the feature. This makes it possible, for example, to produce vector lines or raster scanning images. It is also possible by modulating the light output to achieve partial bleaching or demagnetization and thus to generate grayscale images from a color standpoint and reduced magnetization from a magnetic standpoint.

Instead of a light beam as mentioned herein, it is also possible in all the embodiments to use another energy-rich beam, e.g. a laser beam or an electron or neutron beam, as well as radiation in the UV or shorter wavelength region or the IR or longer wavelength region, provided that this radiation has the aforementioned destructive action on the magnetizability of the material, i.e. the molecules, or the luminescence properties of the material.

Figure 3:
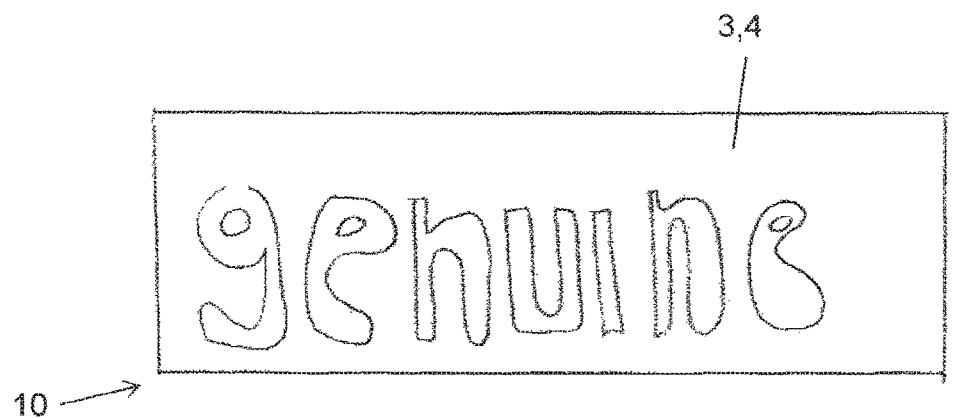
FIG. 3: a schematic top view of the data carrier according to FIGS. 1 and 2 after irradiation.

FIG. 3 shows a schematic top view of the data carrier 10 according to FIGS. 1 and 2 after irradiation by a light source.

As shown in FIG. 3, after irradiation at the irradiated sites, an authenticity feature 3, 4 luminesces as a motif, here in the form of the word "genuine", because of the luminescent component of the luminescent layer 5 or the magnetoluminescent layer 7. At the same site, in visualization of the magnetization, the personalization can be recognized because of demagnetization of the magnetic component of the magnetizable layer 6 or the magnetoluminescent layer 7 as a magnetic field-free zone, which of course is recognizable not optically, but by a magnetic field sensor, which can then recognize the demagnetized components of the personalized authenticity feature. These are then converted by the sensor into image data, for example as a bar code, etc.

Figure 4:
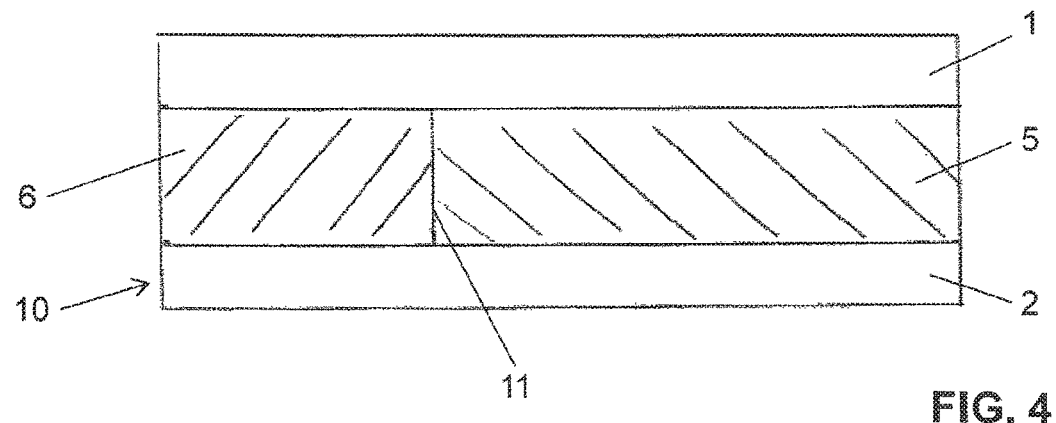
FIG. 4: a section through a data carrier with a card structure according to a third embodiment.
Figure 5:
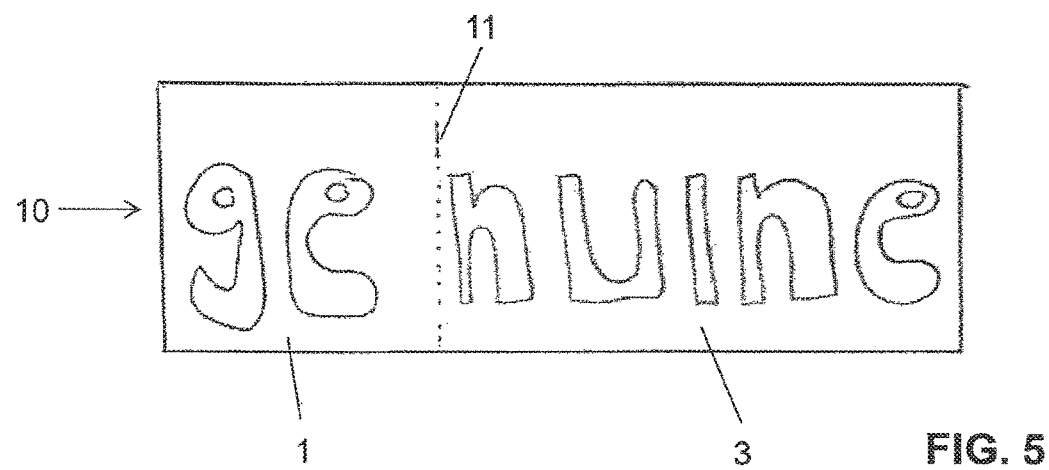
FIG. 5: a schematic top view of the data carrier according to FIG. 4 after irradiation.

FIG. 4 shows a further embodiment of a data carrier 10 with two non-overlapping functional layers 5 and 6 in which the luminescent layer 5 is arranged adjacent to the magnetizable layer 6 so that the two layers 5 and 6 come into contact with one another at a separating surface 11. Following irradiation that is effective for the two layers 5 and 6, a complementary image or complementary personalization is produced, wherein the respective portion of the personalization lying over one of the two functional layers respectively does not include the function of this functional layer. In the example of the word "genuine" shown in FIG. 5, the phenomenon is expressed as the lack of a locally detectable magnetic field in the first series of letters, "ge", for the authenticity feature 4, and as the lack of luminescence in the second series of letters, "nuine", for the authenticity feature 3. In this case, an individual "erasing" light source can be used that erases both the luminescence capacity of the layer 5 and the magnetizability of the layer 6, for example by sequentially passing over and scanning the surface of the data carrier 10 on the layer 1 or the layer 2. However, two light sources can also be used, as shown in FIGS. 7 and 8, which are responsible for deactivating one or the other function.

Figure 6:
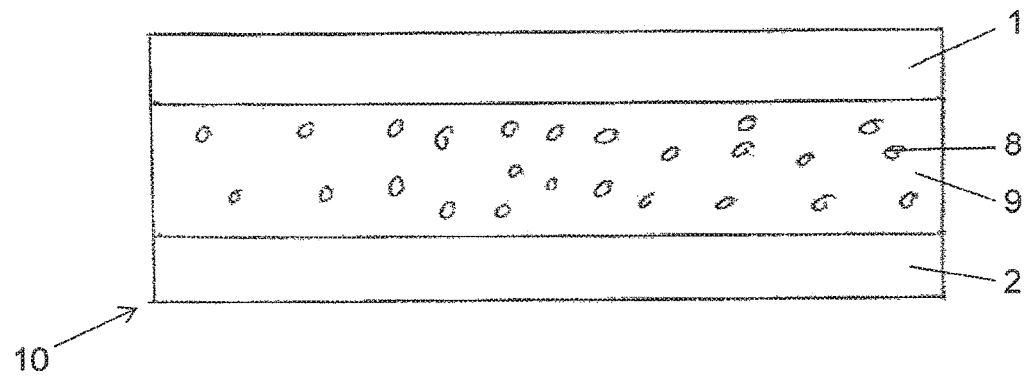
FIG. 6: a section through a data carrier with a card structure according to a fourth embodiment.

FIG. 6 shows a further embodiment of a data carrier 10 in which the luminescent component and the magnetizable or magnetic component are constituents of a compound 8 that is located within a molecular magnetoluminescent layer 9. The difference compared to the layer 2 of FIG. 2 is that in this case, a molecule is incorporated into the layer 9 that is both luminescent and magnetically active and can therefore be erased and deactivated in one, the other, or both ways so that it loses its capacity for luminescence and/or the magnetic field response.

Figure 7:
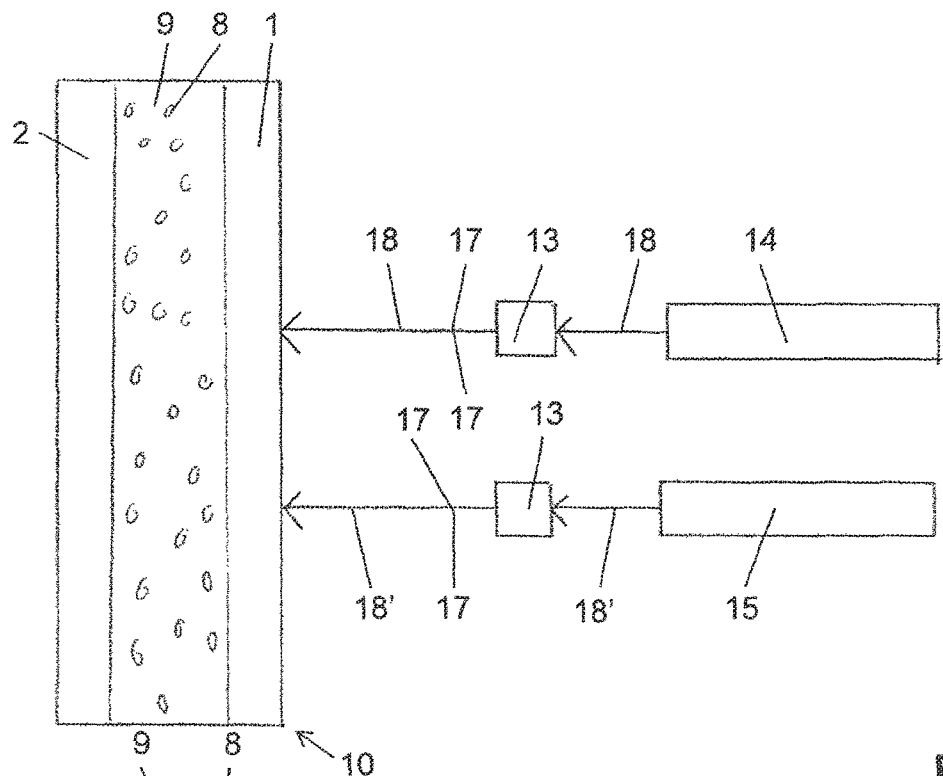
FIG. 7: a representation of a first arrangement with two different light sources for personalization of a data carrier according to the fourth embodiment.

FIG. 7 shows a first arrangement in which two lasers 14, 15 are used for the personalization of a data carrier 10, with this being shown as an example based on the data carrier 10 according to FIG. 6. Here, both emitted laser radiation 18 of wavelength $\lambda 1$ from a first laser and laser radiation 18' of wavelength $\lambda 2$ from a second laser 15 are used. The two laser beams 18, 18' are scanned by a scanner 13 and then impinge on the data carrier 10. In order to achieve scanning movement of the laser beams 18, 18', one can use, for example, a galvo scanner as the scanner 13, with this type of scanner and the use thereof being known to the person skilled in the art. Depending on the orientation of the scanner 13, the scanning laser beams 18, 18' impinge according to a direction of movement 17 on the data carrier 10, wherein this direction of movement 17 can be at a 90° angle to impingement of the laser beams 18, 18' on the data carrier 10, as shown here, i.e. along the surface normals of the data carrier 10, or at an offset angle not shown here. The first laser beam 18 of wavelength $\lambda 1$ causes selective destruction of the luminescent component of the authenticity feature, and the second laser beam 18' of wavelength $\lambda 2$ causes selective destruction of the magnetic component of the authenticity feature.

Figure 8:
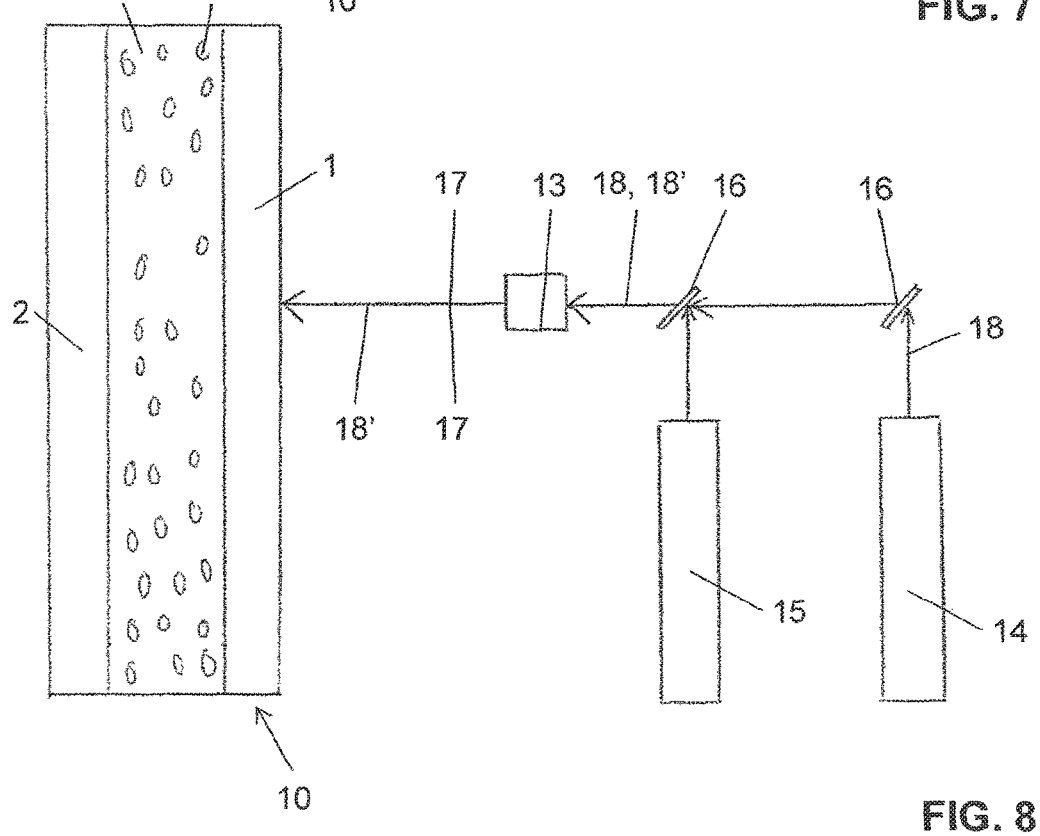
FIG. 8: a representation of a second arrangement with two different light sources for personalization of a data carrier according to the fourth embodiment.

FIG. 8 shows a second arrangement in which the two lasers 14, 15 for the personalization of the data carrier 10 according to FIG. 6 are shown by way of example. In this second arrangement, the emitted laser beams 18, 18' of wavelengths $\lambda 1$ and $\lambda 2$ respectively are reflected by an optically reflecting element 16. Here, the optically reflecting element 16 can for example be a dielectric mirror or a dielectric reflective prism. Such dielectric mirrors or dielectric reflective prisms, which reflect radiation at a specified wavelength or a specified wavelength range and are otherwise at least partially transparent, are known to the person skilled in the art. The first laser beam 18 and the second laser beam 18', which are produced in a spatially separated manner, are thus directed to one and the same scanner 13. After being reflected by the reflecting element 16, the two laser beams 18, 18' preferably continue along a direction of movement 17, wherein this direction of movement 17 can be at a 90° angle to impingement of the laser beams 18, 18' on the data carrier 10, as shown here, i.e. along the surface normals of the data carrier 10, or at an offset angle not shown here.

In this second arrangement as well, the first laser beam 18 of wavelength $\lambda 1$ causes selective destruction of the luminescent component of the authenticity feature, and the second laser beam 18' of wavelength $\lambda 2$ causes selective destruction of the magnetic component of the authenticity feature.

In both the first arrangement shown in FIG. 7 and the second arrangement shown in FIG. 8, use of the two lasers 14, 15 is not limited to the personalization of a data carrier 10 according to FIG. 6, but can be generally used for the simultaneous or sequential erasing of the luminescent component and the demagnetization of the magnetic component.

LIST OF REFERENCE NUMBERS

1 Covering layer
2 Carrier layer
3 Luminescent authenticity feature
4 Magnetizable or magnetic authenticity feature
5 Luminescent layer
6 Magnetizable layer
7 Magnetoluminescent layer
8 Compound
9 Molecular magnetoluminescent layer
10 Data carrier
11 Separating surface
12 Contact surface
13 Scanner
14 First laser
15 Second laser
16 Optical reflecting element
17 Direction of movement of the scanning laser beam
18, 18' Laser beams

The invention claimed is:

1. A data carrier comprising at least one authenticity feature provided in said data carrier, which on irradiation with a high-energy beam is personalizable by means of changes in physical and/or chemical properties, wherein the at least one personalizable authenticity feature is composed of at least one magnetizable component, wherein the at least one personalizable authenticity feature is magnetically configured, wherein at least one from intensity or wavelength of the energy-rich beam is selected such that the at least one personalizable magnetic authenticity feature undergoes a local structural change on irradiation, and wherein the magnetizable component of the at least one personalizable magnetic authenticity feature is at least partially destroyed by the local structural change, so that the at least one personalized magnetic authenticity feature forms an area of lesser or no magnetic field in the overall image after irradiation, wherein at least one second authenticity feature is provided in the data carrier, which on irradiation with said energy-rich beam or a further energy-rich beam is personalizable, the at least one second personalizable authenticity feature is composed of at least one color-active component, the at least one second personalizable authenticity feature is configured to be luminescent, wherein at least one from the intensity or wavelength of the beam is selected such that the at least one personalizable luminescent authenticity feature undergoes a local structural change on irradiation, and the color-active component of the at least one personalizable luminescent authenticity feature is at least partially destroyed by the local structural change, so that the at least one personalized luminescent authenticity feature does not luminesce on irradiation together with the at least one non-personalized luminescent authenticity feature, thus causing a negative image in the overall luminescent image or a negative luminescent image to become visible.

2. The data carrier as claimed in claim 1, wherein the color-active component is located in and/or on at least one luminescent layer and the magnetizable or magnetic component is located in and/or on at least one magnetizable layer.

3. The data carrier as claimed in claim 1, wherein the magnetizable layer and the luminescent layer are arranged adjacent to each other or the magnetizable layer and the luminescent layer are arranged one on top of the other, wherein the layer that is arranged in the direction of the incident beam and is irradiated as the first layer by the beam is translucent to the beam used, which in the other layer influences the authenticity features, and in particular partially destroys them.

4. The data carrier as claimed in claim 1, wherein the luminescent component and the magnetizable or magnetic component are located together within and/or on at least one magnetoluminescent layer.

5. The data carrier as claimed in claim 1, wherein the luminescent component and the magnetizable or magnetic component are constituents of a compound and wherein this compound is located in and/or on at least one molecular magnetoluminescent layer.

6. The data carrier as claimed in claim 1, wherein the data carrier has one or a plurality of additional layers, wherein this one or a plurality of additional layers are formed as a protective layer and/or contain further additive substances that change color on irradiation.

7. The data carrier as claimed in claim 1, wherein at least one layer from the group encompassing the magnetizable layer, the luminescent layer, the magnetoluminescent layer, the molecular magnetoluminescent layer and the additional layer, respectively, extends over the entire data carrier.

8. The data carrier as claimed in claim 1, wherein the at least partial destruction of the color-active component and the magnetizable component of the at least one personalizable authenticity feature is carried out by irradiation of the same type, in particular by a single radiation source, in particular a laser, or wherein the at least partial destruction of the color-active component and the magnetizable component of the at least personalizable authenticity feature is carried out by at least two types of irradiation, in particular by two separate radiation sources.

9. The data carrier as claimed in claim 1, wherein the at least one personalized authenticity feature can be caused to luminesce and be demagnetized under the effect of electromagnetic radiation and/or corpuscular radiation.

10. The data carrier as claimed in claim 1, wherein the at least one personalized authenticity feature is effectible by photoluminescence and/or chemoluminescence and/or bioluminescence.

11. The data carrier as claimed in claim 1, wherein luminescence can occur in the visible and/or the non-visible spectral range.

12. The data carrier as claimed in claim 1, comprising a covering layer and a carrier layer, wherein the covering layer is arranged on the side of the data carrier facing toward the irradiation and is translucent to the beam used.

13. The data carrier as claimed in claim 1, wherein the luminescent substance of the at least one personalizable authenticity feature belongs to the substance group of the tin sulfide derivatives, benzoxazinone derivatives, pyrene derivatives or pyrazoline derivatives.

14. The data carrier as claimed in claim 1, wherein the high-energy beam is a beam from the group encompassing a laser beam or an electron or neutron beam.

15. The data carrier as claimed in claim 1, wherein the magnetizable substance of the at least one personalizable authenticity feature belongs to the substance group of the organometallic complexes or is an organic compound with a radical bearing functional group that is stabilized by resonance and/or steric effects, and/or the compound of the personalizable authenticity feature belongs to the molecule classes of the polycyclic compounds, aromatic compounds, or conjugated compounds, and/or the magnetizable substance has a Curie temperature above room temperature.

16. A data carrier comprising at least one authenticity feature provided in said data carrier, which on irradiation with a high-energy beam is personalizable by means of changes in physical and/or chemical properties, wherein the at least one personalizable authenticity feature is composed of at least one magnetizable component, wherein the at least one personalizable authenticity feature is magnetically configured, wherein at least one from intensity or wavelength of the energy-rich beam is selected such that the at least one personalizable magnetic authenticity feature undergoes a local structural change on irradiation, and wherein the magnetizable component of the at least one personalizable magnetic authenticity feature is at least partially destroyed by the local structural change, so that the at least one personalized magnetic authenticity feature forms an area of lesser or no magnetic field in the overall image after irradiation,
wherein the magnetizable component in an external magnetic field shows inherent magnetization independently of said external magnetic field, wherein the magnetizable component is magnetized by the external magnetic field, wherein the inherent magnetization of the magnetizable component is oriented parallel to the external magnetic field, wherein the magnetized component is then magnetized, and wherein the personalizable magnetic authenticity feature then constitutes a personalized magnetic authenticity feature.

17. The data carrier as claimed in claim 16, wherein after irradiation with a high-energy beam, the at least one personalized magnetic authenticity feature is neither magnetic nor magnetizable at the irradiation site and forms an area of lesser or no magnetic field at the irradiation site.

18. The data carrier as claimed in claim 17, wherein the area of lesser or no magnetic field of the personalized magnetic authenticity feature is not detected and/or visualized on observation by a suitable detection device, while the areas of the personalized magnetic authenticity feature that were not exposed to irradiation with a high-energy beam show magnetic areas that are detected and/or visualized by the suitable detection device.

19. The data carrier as claimed in claim 16, wherein the luminescent component and the magnetizable or magnetic component are constituents of a compound and wherein this compound is located in and/or on at least one molecular magnetoluminescent layer, wherein the compound is a molecular compound, wherein the magnetizable component and the color-active component are constituents of the molecular compound, wherein the molecular compound is both luminescent and magnetizable, wherein the magnetizable component of the molecular compound is magnetized by the external magnetic field and is then magnetized, and wherein both the luminescent component and the magnetic component of the molecular compound are at least partially destroyed by irradiation.

20. The data carrier as claimed in claim 19, wherein, because of the at least partial destruction of the luminescent component of the molecular compound, this area of the authenticity feature does not luminesce on irradiation by the suitable detection device, while the non-irradiated areas luminesce on irradiation by the detection device, and in that, because of the at least partial destruction of the magnetic component of the molecular compound, this area of the authenticity feature is not detected and/or visualized on observation by a suitable detection device, while the non-irradiated areas are magnetic areas that are detected and/or visualized by the detection device.

21. The data carrier as claimed in claim 16, wherein the high-energy beam is a beam from the group encompassing a laser beam or an electron or neutron beam.

* * * * *